UNITED STATES PATENT OFFICE 2,467,198

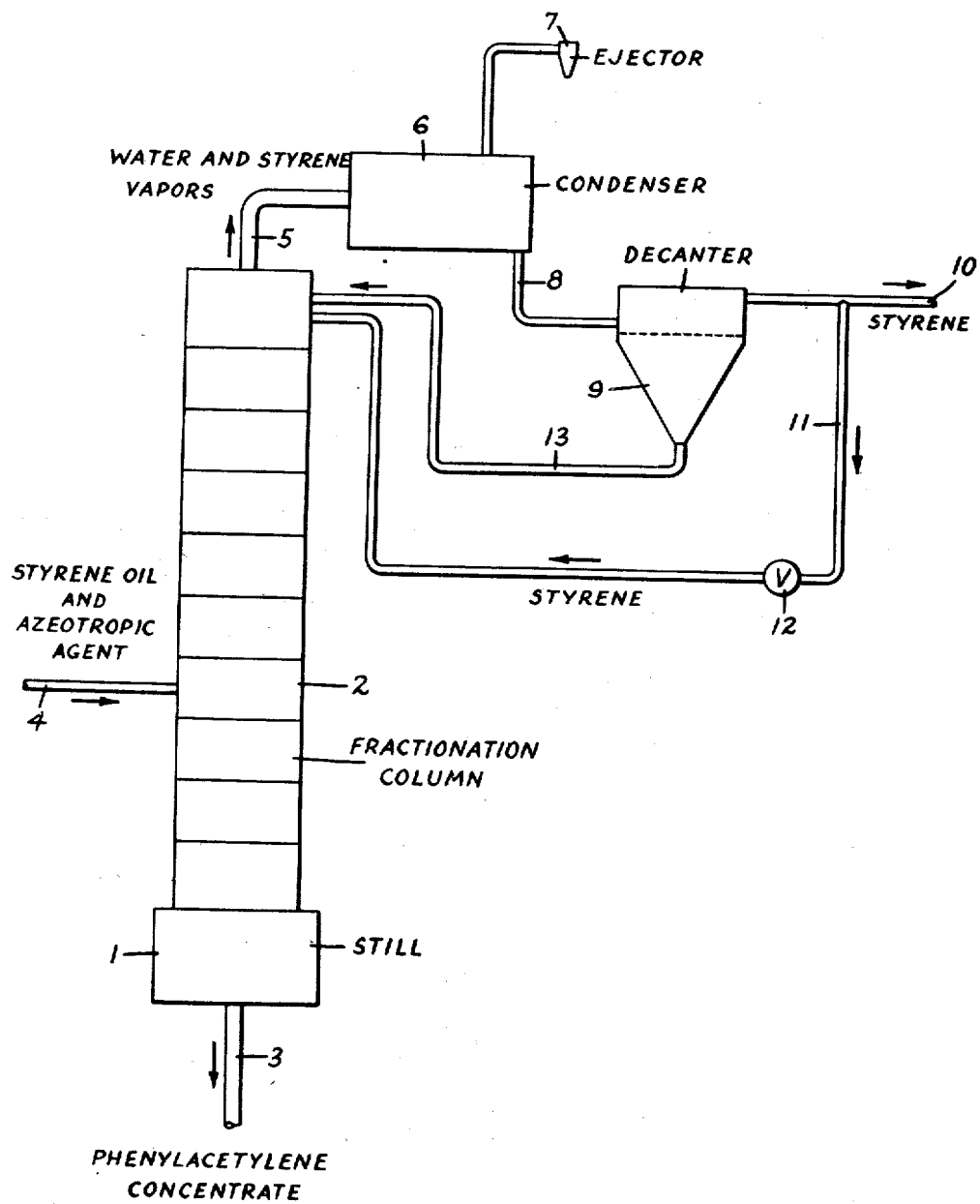

AZEOTROPIC DISTILLATION OF STYRENE FROM PHENYLACETYLENE

Richard B. Greene, Melrose Park, Pa., assignor to Allied Chemical & Dye Corporation, New York, N. Y., a corporation of New York Application September 6, 1945, Serial No. 614,804

11 Claims. (Cl. 202—42)

This invention relates to separation of phenylacetylene from styrene.

Styrene oils recovered from such sources as the crude aromatic hydrocarbon oils produced in coal distillation, gas production, petroleum cracking and reforming, and similar operations, as well as the styrene oils produced synthetically, e. g., by cracking or dehydrogenation of alkyl benzenes, generally contain phenylacetylene admixed therewith. This material interferes with proper polymerization of styrene and is accordingly undesirable in styrene that is to be used for the production of polymerized products, e. g., resins.

It has been attempted to separate this phenylacetylene from the styrene by careful fractionation; this method, however, has been found to be unsuccessful, since the boiling point of phenylacetylene is only two or three degrees below the boiling point of styrene. Although some concentration of phenylacetylene in the overhead product is effected, sufficient is left in the styrene bottoms to give poor polymerization qualities to the styrene, and, moreover, the yield of monomeric styrene from such separation is poor.

It has also been proposed to remove phenylacetylene from a styrene oil by chemical means, for example, by treatment with an ammoniacal cuprous or silver salt. Surface methods are disadvantageous for economic reasons, both because of the cost of the reagents used and the cost of the handling of the styrene oil needed to accomplish removal of the acetylenic constituents.

It is an object of this invention to provide a simple physical method, namely a distillation method, for separating phenylacetylene from styrene oils in which it occurs.

It is a further object of this invention to provide a process in which substantially pure styrene free from phenylacetylene may be obtained by distillation from the usual crude styrene fractions which contain styrene in admixture with other hydrocarbons, including phenylacetylene.

I have discovered that, notwithstanding the close boiling points of styrene and phenylacetylene, styrene substantially free from phenylacetylene may be separated from a styrene oil containing phenylacetylene by carrying out fractional distillation of such styrene oil admixed with a glycol derivative of the group consisting of glycol ethers and ether-ester boiling within the range of from 120° to 150° C., preferably an ethylene glycol ether or ether-ester boiling within the range of from 120° to 150° C. Examples of such derivatives are the monomethyl and the monoethyl ethers of ethylene glycol and ethylene glycol monomethyl ether acetate. These glycol derivatives on distillation with a styrene oil containing phenylacetylene, form azeotropes of the minimum-boiling type with both the styrene and the phenylacetylene; i. e. when a mixture of the styrene oil and the glycol derivative is distilled, the mixtures distill off at temperatures lower than the distillation temperatures of either the hydrocarbons or the glycol derivative making up such mixtures. The preferred glycol derivative is ethylene glycol monomethyl ether. Esters and ether-esters of propylene and iso-butylene glycols boiling within the range of 120° to 150° C. may also be employed.

Moreover, I have made the surprising discovery that, despite the fact that phenylacetylene has a lower boiling point than styrene, the azeotropic mixture formed by the glycol derivative and styrene has a substantially lower distillation temperature than the azeotropic mixture of the glycol derivative and phenylacetylene, and the difference is sufficiently great so that, upon fractional distillation of the derivative and styrene oil mixture, substantially all the styrene is distilled off as an azeotropic mixture with the glycol derivative before any phenylacetylene comes off. Material whose hydrocarbon component consists of phenylacetylene may then be distilled off as a higher fraction or may be left as still residue.

Examples of styrene-containing oils that generally contain phenylacetylene include: (1) drip oil, the oil that settles out from carburetted water-gas and oil-gas mains; (2) the light oils recovered by scrubbing of coke-oven gas, carburetted water gas and oil gas; (3) the lower boiling fractions distilled from coal tar, carburetted water-gas tar, and oil-gas tar; (4) cracked and reformed petroleum oils; (5) the products of pyrolysis of alkyl benzenes; and (6) the products of similar processes involving the synthesis or pyrolysis of aromatic hydrocarbons containing aliphatic substituents, e. g., the product of pyrolysis of a polystyrene resin.

From such styrene-containing material or other sources of styrene, containing phenylacetylene in admixture with the styrene, close-cut styrene fractions boiling, for example, through the range 140° to 146° C., may generally be obtained upon fractional distillation, such fractions containing varying proportions of styrene and generally containing substantial proportions of other aromatic hydrocarbons such as xylene and ethylbenzene in addition to small proportions of phenylacetylene. It may be desirable, first, to subject such styrene fractions to preliminary azeotropic distillation, for example in accordance with the process of copending application Serial No. 614,803, filed September 6, 1945, to obtain a styrene concentrate containing up to more than 98% styrene; in the separation of styrene from alkyl benzenes by such an azeotropic distillation operation, the phenylacetylene remains with the styrene component and the styrene concentrate therefore still contains phenylacetylene as an impurity. The process of my invention for removal of phenylacetylene is applicable either to such a styrene concentrate or to the less concentrated styrene oil containing substantial proportions of other hydrocarbons along with phenylacetylene. My process is advantageous when such styrene oils contain at least about 0.05% phenylacetylene.

In the production of pure monomeric styrene by the process of my invention I have generally found it advantageous to subject the styrene oil also to chemical purification treatment to remove color-forming bodies; such chemical purification treatment may, for example, particularly in the case of styrene oils recovered from drip oils, light oils and tar distillates, consist of washing with sulfuric acid followed by neutralization and distillation. Other methods of purifying styrene oils are known in the art. Such purification may be carried out either prior to or following the azeotropic distillation step of my invention for removal of phenylacetylene; preferably, sulfuric acid washing and neutralization are carried out subsequent to the azeotropic distillation steps and are followed by a final distillation to produce water-white substantially 98% or better monomeric styrene.

The azeotropic distillation to separate phenylacetylene from a styrene oil containing it may be carried out as a batch or continuous distillation in which the entire amount of agent needed may be added to the styrene oil before fractionation. Alternatively, the agent may be added gradually in continuous or intermittent fashion during the course of the fractionation. In the latter case the agent recovered from the distillate during fractionation as described below may be returned to the still and an amount of agent may thus be employed in the process substantially less than the total amount necessary to supply to the still during distillation. One method of bringing about continuous recovery of agent from the distillate during fractionation and its return to the still is to have water present in the upper part of the fractionating column as more fully described below. The water may be looked upon as an auxiliary azeotropic agent in this case.

The amount of primary agent, i. e., glycol derivative, added to the styrene oil to be subjected to azeotropic distillation should be regulated so that there will not be an undue amount remaining in the still residue when fractional distillation is discontinued. However, there should be enough agent present so that the azeotropic ratio of agent to hydrocarbon in the vapor within the still and the fractionating column will be maintained while styrene is being distilled over. This ratio, in the case of ethylene glycol monomethyl ether, I have found to be roughly seven parts styrene to eight parts ethylene glycol monomethyl ether by volume in the vapor mixture of styrene and agent that passes up from the still.

As above indicated, the azeotropic distillation of the phenylacetylene-containing styrene oil with the glycol derivative, with or without water as an auxiliary agent, may be carried out either batchwise or continuously. In a batchwise fractionation not employing water as auxiliary agent, the distillate at first consists of styrene substantially entirely free of phenylacetylene in azeotropic admixture with the glycol derivative; as the fractionation continues to the point where the greater part of the styrene has been distilled over and the temperature of the still approaches the distillation temperature of the glycol derivative-phenylacetylene azeotrope, a small proportion of the phenylacetylene may begin to come over with the styrene. The course of the fractionation may be followed by taking samples of the distillate and testing them for phenylacetylene. This is done by shaking a small sample with an equal volume of 5% ammoniacal silver nitrate solution (Tollens reagent) and noting the precipitate formed. The distillation is advantageously continued until the phenylacetylene content of the distillate rises to about 0.03%.

In continuous operation, the styrene oil concentrate and azeotropic agent may be continuously introduced into an intermediate portion of the fractionating column. A product whose oil component is substantially pure styrene may then be continuously taken off overhead in the form of an azeotropic mixture with the ethylene derivative, and a phenylacetylene concentrate may be continuously withdrawn from the still. The pure styrene-containing distillate may be condensed, the agent separated as described below, and the separated agent returned to the fractionating column along with the entering styrene oil.

In batchwise distillation employing water as auxiliary agent, a charge of the styrene oil containing phenylacetylene, glycol derivative and water is placed in the still and subjected to fractional distillation. The water, the most volatile component of the mixture, is generally substantially completely volatilized from the still charge and is eventually found in substantial proportions only in the upper part of the fractionating column and in the distillate. Besides water, the distillate contains substantially pure styrene, but as explained below, with efficient fractionation only a small amount of the glycol derivative comes over in the distillate. As the distillate is condensed, it stratifies into a water layer and hydrocarbon oil layer. The water layer is continuously returned to the top of the column. In the upper part of the column, therefore, water in the liquid state along with some condensed hydrocarbon flows downwardly countercurrent to vapors of water, hydrocarbon and glycol derivative passing upwardly through the column. The presence of this water in the upper part of the column causes steam distillation to take place there and the vapor mixture that passes over from this steam distillation contains substantially only water and water-insoluble hydrocarbon, i. e., is substantially free of water-soluble glycol derivative. The primary azeotropic agent, i. e., the glycol derivative, is thus substantially completely retained in the still system largely distributed throughout the fractionating column. The water, because of its volatility, is not found in substantial amount below about the upper fifth of the column. As in the batchwise distillation above described, distillation is continued as long as a styrene product of desired purity is obtained as distillate.

The distillation employing water as auxiliary azeotropic agent may also be carried out continuously by continuously introducing a mixture of the styrene oil and glycol derivative into an intermediate portion of the fractionating column of a still and column system wherein a mixture of styrene oil, glycol derivative, and water is being fractionated; water for the fractionation is introduced continuously or intermittently into the top of the column. As in the batchwise procedure above described, all or the greater part of the water needed for fractionation may be provided by continuous return of the water component of the condensed distillate to the top of the fractionating column.

I have found it advantageous to carry out the distillation at reduced pressures, i. e., at pressures not above about 100 mm. mercury absolute, since it is desirable to maintain a relatively low temperature in the system, preferably a temperature below 100° C. so as to avoid excessive polymerization of the styrene in the still. The addition of a polymerization inhibitor during this azeotropic distillation in unnecessary since the phenylacetylene serves this purpose.

When carrying out the process of my invention in such a way that the styrene distillate fractions obtained contain the glycol derivative, i. e., when carrying out the distillation without the auxiliary agent, water, the distillate fractions are treated to recover the glycol derivative. This may be conveniently done by washing with water to dissolve out the agent. Substantially pure monomeric styrene oil free from phenylacetylene is thus obtained. The water solution of the glycol derivative obtained in the washing operations may be distilled with hydrocarbon to separate the water from the glycol derivative, and the glycol derivative thus recovered may be reused in the process.

Alternatively, the glycol derivative may advantageously be recovered from the pure styrene in which it is dissolved by a further azeotropic distillation of the styrene-glycol derivative solution with water as the azeotropic agent. This may be carried out by charging the styrene-glycol derivative solution to the still with a relatively small proportion of water and subjecting the mixture to fractional distillation. The early distillate consists of azeotropic mixtures of styrene and water substantially free of glycol derivative or azeotropic mixtures of styrene, water and relatively small proportions of glycol derivative. This distillate is condensed, whereupon it stratifies into two layers. The lower aqueous layer is continuously returned to the column whereas the upper styrene layer is returned only in part to maintain column equilibrium, the remainder being withdrawn as product. This is continued until nearly all the styrene has been removed from the still charge. When such a point has been reached, distillation is continued as before, but the water layer is now withdrawn while the small quantity of hydrocarbon layer is returned to the still. This is continued until the water has been removed. At this point the still residue consists of practically pure glycol derivative with only a small quantity of styrene admixed therewith. This residue may be reused directly or it may be subjected to a straight distillation to obtain a colorless glycol derivative product, and this product may then be employed as primary agent in subsequent azeotropic distillations for separation of phenylacetylene from styrene. Any glycol derivative agent remaining in the phenylacetylene concentrate in the still may be similarly removed from the hydrocarbon.

The accompanying drawing illustrates diagrammatically the continuous process of the invention. In the drawing the numeral 1 designates a still provided with fractionating column 2 for rectification of vapors and with outlet 3 for withdrawal of phenylacetylene concentrate. An inlet 4 leads into the side of fractionating column 2 for introducing styrene oil to be purified, azeotropic agent, and water. From the top of column 2 conduit 5 leads to condenser 6 provided with evacuating means represented by steam ejector 7. From condenser 6 condensate line 8 leads to decanter 9. Decanter 9 has an outlet pipe 10 near the top for withdrawal of styrene and from this line 10 a secondary return line 11 provided with a valve 12 leads back to column 2 near the top thereof. From the bottom of decanter 9 a water pipe 13 leads to the top of column 2.

In carrying out the process styrene oil and azeotropic agent are introduced at inlet 4 and heat is supplied to still 1 to effect distillation. The distillate vapors are passed through conduit 5 to condenser 6. The resulting condensate flows to decanter 9 in which water separates and returns to the top of the column via pipe 13. Styrene product flows out through outlet 10. The water returning to the top of the column washes out most of the azeotropic agent from the vapors and returns the agent to the lower sections of the column for reuse. Thus, after the system has maintained equilibrium only a small amount of azeotropic agent need be introduced with the styrene oil to replace the small losses through incomplete condensation and incomplete separation from styrene product. Since water likewise is retained in the system, the amount of water added need be only sufficient to replace losses. Return line 11 for styrene supplies sufficient styrene to maintain column equilibrium.

As above stated, the styrene product from which phenylacetylene has been separated may advantageously be subjected to sulfuric acid treatment followed by neutralization to remove color-forming bodies. The acid-purified styrene product may then be distilled to produce a water-white monomeric styrene product of 98% or better purity. The accompanying flow sheet illustrates a process embodying one form of the invention.

The following examples are illustrative of the process of my invention:

*Example 1.*—A drip-oil-solvent fraction (approximate boiling range 125° to 155° C.) was subjected to batch fractionation to produce a 50% styrene fraction of boiling range of about 140° to 150° C. This styrene fraction was then subjected to continuous azeotropic distillation in the presence of ethylene glycol monomethyl ether and water in accordance with the process described in copending application Serial No. 614,803, filed September 6, 1945, to produce a substantially pure styrene concentrate as still bottoms product. This distillation was carried out in the presence of a small quantity of a mixture of high-boiling phenols to inhibit polymerization. The styrene concentrate thus produced contained about 1.5% by weight of the high-boiling phenol mixture, about 0.6% by weight of polymerized styrene, and about 0.22% by weight of phenylacetylene, the remainder consisting of substantially only monomeric styrene and traces of o-xylene.

The styrene concentrate thus obtained was subjected to azeotropic distillation in the presence of ethylene glycol monomethyl ether and water for removal of phenylacetylene by continuously feeding a mixture of the styrene concentrate and ethylene glycol monomethyl ether in the proportion of 15.9 parts by volume of the ether to 84.1 parts by volume of the styrene concentrate to a fractionating column of 26 theoretical plates at a point corresponding to the fifth theoretical plate from the bottom. The still and column were maintained under vacuum during the distillation; the pressure at the top of the column was about 50 mm. mercury. This continuous azeotropic distillation was carried out with water present in the upper part of the fractionating column and in the distillate. The distillate was continuously stratified and the water layer and part of the oil layer returned to the top of the column. The reflux ratio during the distillation was maintained at about 28/1.

The product withdrawn overhead from this distillation was a mixture of about 2.5 parts, by volume of ethylene glycol monomethyl ether and about 97.5 parts by volume of substantially 99% monomeric styrene of refractive index 1.5461. The small amount of ethylene glycol monomethyl ether was removed by washing with water. This product contained from 0.01% to 0.03% phenylacetylene, a quantity too small to interfere with subsequent polymerization of the styrene. The recovery of substantially 99% monomeric styrene as overhead product was about 94.5%, based on the styrene in the feed.

The small quantity of still bottoms product recovered in this azeotropic distillation contained about 59% by volume of ethylene glycol monomethyl ether which could be removed by washing. The remaining oil contained substantially more than 1% phenylacetylene.

The monomeric styrene freed of phenylacetylene by azeotropic distillation and water-washed to remove ethylene glycol monomethyl ether was agitated with sulfuric acid to remove minute amounts of color bodies, neutralized with flake sodium hydroxide, and distilled. A water-white monomeric styrene of 99% or better purity was thus produced.

*Example 2.*—A 50% styrene fraction (45 volume parts) containing phenylacetylene obtained from drip oil solvent was subjected to batch fractional distillation in the pressure of approximately 55 volume parts of ethylene glycol monomethyl ether. Distillation was carried out under an absolute pressure of about 60 mm. of mercury.

Distillation was continued until all but a small portion of the styrene fraction had been taken overhead in the distillate. In this manner a distillate product was collected which represented styrene of 98% purity substantially free of phenylacetylene. The phenylacetylene present in the original 50% styrene fraction was concentrated in the residue.

Since certain changes may be made in carrying out the above process without departing from the scope of the invention, it is intended that all matter contained in the above description shall be interpreted as illustrative and not in a limiting sense.

I claim:

1. In a method for substantially removing phenylacetylene from a styrene oil containing it, the step that comprises fractionally distilling a mixture of such oil and a glycol derivative of the group consisting of glycol ethers and ether-esters boiling within the range of from 120° C. to 150° C. and maintaining the distillation temperature such that a substantial portion of the styrene is distilled overhead.

2. In a method for removing phenylacetylene from a styrene oil containing it, the step that comprises fractionally distilling a mixture of such oil, a glycol derivative of the group consisting of glycol ethers and ether-esters boiling within the range of from 120° C. to 150° C., and water, and maintaining the distillation temperature such that a substantial portion of the styrene is distilled overhead.

3. In a method for substantially removing phenylacetylene from a styrene oil containing it, the step that comprises fractionally distilling a mixture of such oil and ethylene glycol monomethyl ether, and maintaining the distillation temperature such that a substantial portion of the styrene is distilled overhead.

4. In a method for removing phenylacetylene from a styrene oil containing it, the step that comprises fractionally distilling a mixture of such oil, ethylene glycol monomethyl ether, and water, and maintaining the distillation temperature such that a substantial portion of the styrene is distilled overhead.

5. In a method for lowering the phenylacetylene content of a styrene oil containing sufficient phenylacetylene to affect polymerization, the step that comprises fractionally distilling a mixture of such oil and ethylene glycol monomethyl ether and maintaining the distillation temperature such that the major portion of the styrene is distilled overhead as a styrene oil free of phenylacetylene in amoun sufficient to affect polymerization.

6. In a method for lowering the phenylacetylene content of a styrene oil containing sufficient phenylacetylene to affect polymerization, the step that comprises fractionally distilling a mixture of such oil, ethylene glycol monomethyl ether, and water, and maintaining the distillation temperature such that the major portion of the styrene is distilled overhead as a styrene oil free of phenylacetylene in amount sufficient to affect polymerization.

7. In a method for lowering the phenylacetylene content of a styrene oil containing at least about .05% phenylacetylene, the step that comprises fractionally distilling a mixture of such oil and ethylene glycol monomethyl ether, and maintaining the distillation temperature such that the major portion of the styrene is distilled overhead as a styrene oil containing substantially less than .03% phenylacetylene.

8. In a method for lowering the phenylacetylene content of a styrene oil containing sufficient phenylacetylene to affect polymerization, the steps that comprise adding ethylene glycol monoethyl ether to the oil and subjecting this mixture to fractional distillation and maintaining the distillation temperature such that the major portion of the styrene is distilled overhead as a styrene oil free of phenylacetylene in amount sufficient to affect polymerization.

9. In a method for lowering the phenylacetylene content of a styrene oil containing sufficient phenylacetylene to affect polymerization, the step that comprises fractionally distilling a mixture of such oil and ethylene glycol monomethyl ether, at a pressure under 100 mm. mercury, and maintaining the distillation temperature such that the major portion of the styrene is distilled overhead as a styrene oil free of phenylacetylene in amount sufficient to affect polymerization.

10. In a method for substantially removing phenylacetylene from a styrene oil containing sufficient phenylacetylene to affect polymerization, the step that comprises continuously fractionally distilling a mixture of said styrene oil and ethylene glycol monomethyl ether, maintaining the distillation temperature such that the major portion of the styrene is distilled overhead, continuously withdrawing a distillate product comprising a styrene oil free of phenylacetylene in amount sufficient to affect polymerization and continuously withdrawing a still bottoms product comprising a phenylacetylene concentrate.

11. In a method for substantially removing phenylacetylene from a styrene oil containing sufficient phenylacetylene to affect polymerization, the step that comprises continuously fractionally distilling a mixture of said styrene oil, ethylene glycol monomethyl ether, and water, maintaining the distillation temperature such that the major portion of the styrene is distilled overhead, continuously withdrawing a water-oil mixture as distillate product, stratifying said distillate product into a liquid aqueous phase and a liquid oil phase consisting of a styrene oil free of phenylacetylene in amount sufficient to affect polymerization, returning said aqueous liquid to the fractional distillation operation during the course of the distillation, and continuously withdrawing a still bottoms product comprising a phenylacetylene concentrate.

RICHARD B. GREENE.

REFERENCES CITED

The following references are of record in the file of this patent:

UNITED STATES PATENTS

| Number | Name | Date |
|---|---|---|
| 2,376,870 | Engel | May 29, 1945 |
| 2,380,019 | Bloomer | July 10, 1945 |
| 2,381,996 | Bloomer | Aug. 14, 1945 |
| 2,398,689 | Bloomer | Aug. 16, 1946 |